United States Patent
Nemeh

Patent Number: 5,152,835
Date of Patent: Oct. 6, 1992

[54] COMPOSITE TITANIA-CALCINED KAOLIN OPACIFYING PIGMENTS AND METHOD FOR MAKING AND USING SAME

[75] Inventor: Saad Nemeh, West Long Branch, N.J.

[73] Assignee: Engelhard Corporation, Iselin, N.J.

[21] Appl. No.: 697,649

[22] Filed: May 8, 1991

[51] Int. Cl.$^5$ .............................................. C09C 1/36
[52] U.S. Cl. .................................. 106/437; 106/416; 106/417; 106/436; 106/442; 106/446; 106/447
[58] Field of Search .............. 106/486, 487, 416, 417, 106/436, 437, 442, 446, 447

[56] References Cited

U.S. PATENT DOCUMENTS

| | | | |
|---|---|---|---|
| 3,726,700 | 4/1973 | Wildt | 106/437 |
| 3,846,147 | 11/1974 | Tapper | 106/486 |
| 4,738,726 | 4/1988 | Pratt et al. | 106/487 |
| 5,078,793 | 1/1992 | Caton | 106/417 |

FOREIGN PATENT DOCUMENTS 9105604 5/1991 PCT Int'l Appl. .
9105745 5/1991 PCT Int'l Appl. .

OTHER PUBLICATIONS

Hawley's Condensed Chemical Dictionary, 11th Ed., Van Nostrand Rheinhold, 1987, pp. 232, 528.

Primary Examiner—Mark L. Bell
Assistant Examiner—Scott L. Hertzog
Attorney, Agent, or Firm—Inez L. Moselle

[57] ABSTRACT

Novel titania-calcined kaolin composite pigments wherein structuring and adhesion of titania and calcined kaolin particles is achieved by use of a cationic polyelectrolyte. Methods for compositing titania and calcined kaolin pigments which feature the presence of at least one polyanionic dispersant (such as sodium polyacrylate, sodium silicate, sodium condensed phosphate or mixtures thereof) in the pigment slurry into which cationic polyelectrolyte is introduced and the use of strongly alkaline pH (e.g., above 9).

21 Claims, 1 Drawing Sheet

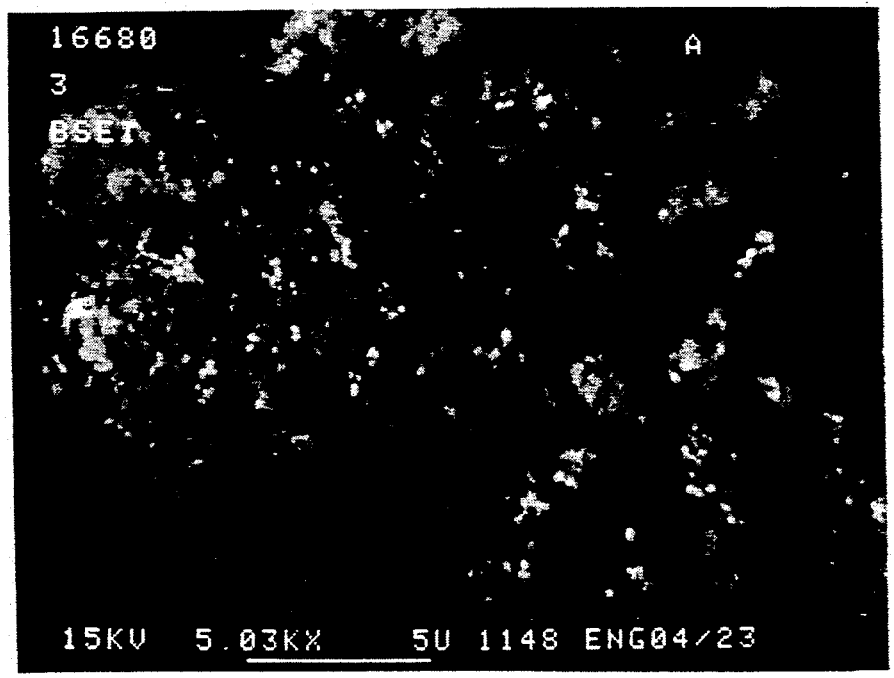

COMPOSITE TITANIA-CALCINED KAOLIN OPACIFYING PIGMENTS AND METHOD FOR MAKING AND USING SAME

FIELD OF THE INVENTION

This invention relates to opacifying pigments useful as coating and filling pigments by the paper industry or as extender pigments in the manufacture of paints. More specifically, the invention relates to composite pigments comprising particles of titania and particles of calcined kaolin mixed and adhered together into unitary particles by means of a cationic polyelectrolyte.

BACKGROUND OF THE INVENTION

Titania is a white pigment, available in rutile and anatase crystalline forms, and is widely used to impart opacity in paper, paints and plastics. Calcined kaolin clay, especially low abrasion forms thereof, is frequently used alone or in combination with titania when opacification is desired at a lower cost. It is well known that calcination of kaolin results in increased light scattering of the clay, manifest by enhanced brightness and opacification of coated and filled paper and paint films. Thus, calcined kaolin pigments such as the product available commercially from Engelhard Corporation under the registered trademarks ANSILEX and ANSILEX 93, are widely used by the paper industry and the paint industry. Heating of kaolin particles results in a thermally bulked structure. See, for example, U.S. Pat. No. 3,586,523, Fanselow et al. The conversion of kaolin clay to calcined clay may be represented by the equation:

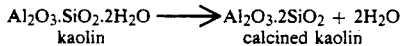

$$\underset{\text{kaolin}}{Al_2O_3 \cdot SiO_2 \cdot 2H_2O} \longrightarrow \underset{\text{calcined kaolin}}{Al_2O_3 \cdot 2SiO_2} + 2H_2O$$

This is an oversimplification of the reaction involved in the transformation because the thermal treatment effects profound changes in the morphology, particle size distribution and light scattering properties of the clay. It also changes the chemical reactivity of the clay in both acidic and alkaline media.

Calcined kaolin clay is frequently used as an extender for titania pigments in paper coating and filling. See, for example, U.S. Pat. No. 4,874,466, Savino in which a cationic polymer is used as a dispersant for the titania and paper is filled with this titania using a filler formulation that also includes calcined kaolin. It has already been proposed to provide composite titania pigments which provide optimum spacing for the titania particles to maximize opacification and other properties. Reference is made to U.S. Pat. No. 3,726,700, Wildt. In accordance with the teachings of this patent, titania particles are adhered to particles of clay, preferably calcined kaolin, by a precipitate of inorganic oxides (silica, titania, alumina and combinations thereof), the oxides being formed by precipitation of alkaline or acidic precursor salts with appropriate pH adjustment of a slurry containing a mixture of the titania and calcined kaolin particles. In illustrative examples, the composite pigment product contained 42% TiO$_2$, the balance being calcined kaolin and inorganic oxide cement. Recently a titania-calcined kaolin composite pigment which appears to contain an organic adhesive and a similar level of TiO$_2$ has been introduced to the paper industry.

Successful commercialization of composite titania-calcined kaolin composite pigments, however, requires more than the provision of products which are highly effective opacifying agents. In most cases, such as in paper applications, desirable opacifying pigments should have acceptable fluidity when dispersed in water at practical pigment solids levels and these slurries must resist settling under static condition. For example, the pigment should be capable of being formed into a high solids slurry e.g., one containing at least 50% pigment solids, more preferably at least 52% pigment solids and, most preferably, at least 55% pigment solids. Such slurry should be sufficiently fluid to have a Brookfield viscosity (20 rpm) below 1000 cp, preferably below 500 cp at 20 rpm. See U.S. Pat. No. 4,772,332, Nemeh et al. Not only must the slurry be fluid, but it must resist settling. The inability to provide composites satisfying the dual criteria of rheology and efficient scattering may explain the long interval between the earlier proposal to enhance the efficiency of titania pigments by adhering them to particles of calcined kaolin and present day limited commercial use of such composite pigments.

In addition to the thermal means (calcination) heretofore employed to bulk kaolin clay, chemical means have been used to bulk kaolin clay but these means have been restricted to kaolin in uncalcined (hydrous or hydrated) form. A commercial product available from Engelhard Corporation is supplied under the registered trademark EXSILON and is produced by using a cationic polymer to bulk hydrated kaolin. See, for example, U.S. Pat. No. 4,738,426, Pratt et al. Cationic polymers of this type are also known to be pigment dispersants when employed at adequate levels, generally substantially in excess of levels needed to bulk anionic pigments such as hydrous kaolin.

Observations of the desirable effects of bulking hydrous kaolin with cationic polymer lead to the expectation that addition of cationic polymer to a calcined kaolin pigment would also enhance the scattering of the calcined kaolin pigment, resulting in a premium grade of calcined kaolin pigment. Surprisingly, the attempts were not successful. Similarly, the expectation was that addition of cationic polymer to a titania pigment in the manner used to bulk hydrous kaolin would lead to benefits such as those achieved with the hydrous kaolin. Surprisingly, these attempts were also not successful.

THE INVENTION

This invention results from the unexpected discovery that mixtures of calcined kaolin and titania can be adhered together by addition of a cationic polymer to produce composite pigments having both acceptable rheology coupled with markedly superior light scattering capability as compared to bulked hydrous kaolin, physical blends of titania/calcined kaolin, pure titania and/or superior to known titania/calcined kaolin composite pigments.

One aspect of this invention comprises novel titania/calcined kaolin composite pigments wherein adhesion of titania and calcined kaolin particles is achieved by use of a cationic polyelectrolyte in the presence of water.

Another aspect of the invention comprises methods for compositing titania and calcined kaolin pigments which feature the presence of at least one polyanionic dispersant (such as an alkali metal or ammonium polyacrylate, alkali metal silicate, alkali condensed phosphate or mixtures thereof) into the pigment slurry into which cationic polyelectrolyte is introduced and the use of strongly alkaline pH (e.g., above 9) when cationic polyelectrolyte is introduced and coflocculation is induced. Cationic polyelectrolyte can be added separately to one of the components or to previously formed mixture of the pigments. Additional anionic dispersant can be added before, simultaneously with or subsequent to addition of cationic polymer. However, irrespective of the sequence of addition of reagents, it is necessary to use sufficient cationic polymer to effect flocculation of both pigments to form coherent coflocculated particles and to have at least some anionic dispersant present when cationic polyelectrolyte is added at suitable alkaline pH.

DETAILED DESCRIPTION

Calcined kaolin clay pigments within the scope of the invention are known in the art and may contain from 0 percent to 30 percent by weight of particles larger than 5 micrometers (ESD) and at least 35 percent larger than 2 micrometers. The invention is of special benefit when used with low abrasion (e.g., Valley abrasion value below 50 mg; preferably below 30) ultrafine particle size calcined clay (e.g., calcined clay in which about 88 percent is finer than 2 micrometers and at least 50 percent is finer than 1 micrometer), exemplified by pigments commercially available under the registered trademarks, ANISILEX 93 and SPECTRAFIL.

As used in this specification, the term "calcined kaolin clay pigment" shall include kaolin clays which have been heated to over 400° C. to render them dehydroxylated. The term thereby embraces fully calcined kaolins, which usually have been heated above the 980° C. exotherm, as well as so-called "metakaolin", which results from heating to lower temperatures below the exotherm. Reference is made to Fanselow, et al, U.S. Pat. No. 3,586,823 and to Morris. U.S. Pat. No. 3,519,453, Podschus U.S. Pat. Nos. 3,021,195 and 3,309,214, and British Patent No. 1,181,491, some of which are concerned with kaolin pigments which are calcined at lower temperatures and which therefore can be regarded as metakoalins. Generally, the pH of calcined pigments (20 percent solid slurries with no added dispersant, using deionized water to form slurries) is in the range of 4 to 7, more usually 5 to 6. These slurries exhibit a negative zeta potential.

The term "titania pigment" include titanium oxides in both rutile and anatase forms. The titanium dioxide can be in slurry form such as RPS (DuPont de Nemours & Co.) PGS (Kerr McGee Corp.), and TIONA (SCM), or the titanium dioxide can be in dry form, such as RPD (DuPont de Nemours & Co.) or A-HR (Tioxide Group P.L.C). Unless the titanium dioxide (dry or slurry) is supplied in predispersed form, appropriate dispersant (or dispesant mixtures) for titania pigments should be added at an appropriate stage of preparing of cobulked pigments of the invention. Generally, at least one anionic dispersant (such as an alkali metal acrylate or methacrylate salt) is used as a dispersant for titanium dioxide pigments and mixtures of polyacrylate or other anionic dispersant with an alkanolamine such as amino methylpropanol (AMP) may be employed, especially when the titania is derived from cooler discharge from the chloride process. Slurries of anionically dispersed titania such as RPS have a pH of about 8 and the slurry has a negative zeta potential. Typically, the average particle size of titania pigments is in the range of 0.25 to 0.30 microns.

Generally, the ratio of titania to calcined kaolin of products of the invention is in the range of 10:90 to 90:10, weight basis, preferably in the range of 35:65 to 65:35, and most preferably in the range of 40:60 to 60:40. Optionally minor amounts of other pigments such as kaolin, talc and/or calcium carbonate may also be present.

The amount of cationic polyelectrolyte employed is carefully controlled to be sufficient to form an aggregated structure in which the aggregates are sufficiently strong to survive mechanical forces exerted during manufacture and end use but is carefully limited so as to assure that the product can be formed into a pigment-water slurry that has a solids content of at least 50%, preferably at least 52%, and, most preferably, at least 55%, which slurry has acceptable stable viscosity, e.g., Brookfield viscosity less than about 1000 cp at 20 rpm using a Spindle #3.

The amount of the cationic polyelectrolyte salt used to treat the mixture of pigments may vary with order of addition of reagents, characteristics of the polyelectrolyte including charge density of the polyelectrolyte, the particle size distribution of the pigments, solids content of the slurry to which the polyelectrolyte is added and the amount and type of anionic pigment dispersant(s) that are present. Using the presently preferred dimethyldiallyl ammonium salt polyelectrolyte with calcined kaolin clay and titania and adding cationic polyelectrolyte to a previously deflocculated suspension having a solids content of about 55 to 62 % by weight, useful amounts (calculated on an active polymer basis) range from about 0.10 to 0.25% by weight of the moisture free weight of the pigment mixture, most preferably about 0.1 to about 0.2% by weight. When insufficient cationic polyelectrolyte is used, the effect on opacity and printability in coating applications may be less than desired. On the other hand, an excessive amount of the polyelectrolyte may impair other desired properties of the pigment, especially rheology.

The cationic polyelectrolyte, which is water soluble, is added to the slurry as a dilute aqueous solution, e.g., 0.25-2.5% concentration on a weight basis, with agitation to achieve good distribution in the slurry. Ambient temperature can be used although elevated temperature, e.g., about 150° to 180° F., may be employed. The cationic polyelectrolyte flocculants that are used have closely spaced charged centers and therefore represent high charge density material. Because of this, the reaction with the dispersed pigments is extremely rapid and appears to be complete in a relatively short time, resulting in slurries that are very viscous, at least initially, unless supplementary anionic dispersants are present.

While not wishing to be limited by particulars of the reaction mechanisms, it is now believed that cationic polyelectrolyte reacts with opposite charge sites on the pigment particles as well as the anionic dispersant, ultimately reducing the negative charge on the pigment particles which in turn leads to coalescence by opposite charge attraction. It is also believed that charge centers react and bridge with neighboring particles until the accessible cation exchange centers on pigment or the polymer charge centers are exhausted. The bridging strengthens the bond between the particles, thereby providing a highly shear resistant, composite mineral composition. The amount of polyelectrolyte added is less than that calculated to provide a monolayer on the surface of pigment particles. Present experience based on measurements of particle charge by electrophoretic mobility and zeta-potential measurement indicates that the composite pigments of the invention have a negative charge.

A dimethyl diallyl quaternary ammonium chloride polymer commercially available under the trademark designation Polymer 261 LV from the Calgon Corporation having a molecular weight estimated to be between 50,000-250,000 has been found particularly useful in the practice of the present invention. However the invention is not limited to Polymer 261 LV since other cationic flocculants may provide equivalent, if not superior, results.

Satisfactory results have been realized when the polyelectrolyte was added to deflocculated pigment suspension having pH values in the range of 9.5 to 11. At a pH of 9.5 to 11.0 the charges on the titania surface is modified from the initially negative charge (anionic) to neutral or even mildly positive; therefore the cationic polyelectrolyte chains act as bridges between titania and calcined kaolin. It is this charge reversal on the titania particles that is believed to be responsible for the remarkable bonding that is achieved when the titania particles are contacted with negatively charged particles of calcined kaolin in the presence of the positively charged polymer.

Increasing the pH of the titanium dioxide can be achieved with sodium hydroxide, calcium hydroxide, or ammonium hydroxide and can be practiced by addition of base to a slurry of titania pigment before, simultaneously with or subsequently to mixing titania and calcined kaolin pigment.

After addition of polyelectrolyte, the suspension is substantially thickened as a result of flocculation, e.g., Brookfield viscosity exceeds 1000 cp at 20 rpm. To convert the thick suspension into a fluid, more manageable form, supplemental dispersants, such as those utilized in illustration examples can be added. Effective supplemental dispersants include polyacrylates, sodium silicate, tetrasodium pyrophosphate (TSPP), or combination of these dispersants can be used. The amount of dispersants should be such that a fluid system having a solid content of at least 50% has a Brookfield viscosity under 1000 cp at 20 rpm and a pH of 9.7 to 10.5, depending on the pH prior to polymer addition, and the slurry resists settling under static conditions.

The resultant slurry of coflocculated polyelectrolyte treated pigment product, after optional addition of supplemental dispersing agent, can be provided as (or may used to form) high solids (preferably at least 50% solids, and most preferably at least about 55%) suspensions in water. These suspensions may be formed into aqueous coating colors suitable for application to paper. Alternatively, the slurries can be spray dried and the composite pigment supplied in dried form may also be used as a filler for paper webs or in paints and plastics.

In a presently preferred embodiment of the invention, a deflocculated aqueous suspension of $TiO_2$ having a concentration of about 30-45% solids is used to prepare a composite pigment directly in high solids slurry form without a filtration step. Calcined clay is introduced in a suitable ratio, e.g., about 60 parts by weight calcined kaolin to 40 parts by weight titania, preferably rutile, to produce a high solids, e.g., 62% solids suspension. The pH of this suspension is increased, e.g., to about 11, with sodium hydroxide. The preferred titania pigment is rutile. Addition to this suspension of an appropriate quantity of an aqueous solution of cationic polyelectrolyte, e.g., Calgon 261 LV, produces a flocculated viscous slurry typically having about 56% solids. This viscous slurry is mixed in an agitated mixer such as a Cowles dissolver and then aged to reduce viscosity. An appropriate amount of cationic polymer is in the range of about 0.1 to 0.2% by weight active polymer based on the dry weight of the total titania and calcined kaolin in the slurry.

It is preferred to prepare fluidized slurries of composite pigments that do not contain condensed phosphate salts as dispersants because of the lack of hydrolytic stability of such materials. Thus, while it is preferred to prepare phosphate free high solids slurries, traces of phosphate dispersants can be present. Slurries of titania may contain alkanolamines such as AMP.

The composite pigments of the present invention are especially useful in preparing coating colors for coating lightweight publication papers, particularly magazine stock, to achieve coated papers having excellent opacity and printability. Coat weights of light weight coated publication papers are usually in the range of 3 to 7 lbs./3300 ft². The printability and opacity are generally at least equal (and usually superior) to that achieved by the commercially used blend of delaminated kaolin clay and titanium dioxide or a mechanical blend of titania pigment and calcined kaolin pigment. The rheology of composite pigments of the invention makes use of the pigments by the paper industry especially attractive.

Typical pigments of the invention have the following properties:

| | |
|---|---|
| Wt. ratio $TiO_2$/Calcined kaolin | 30/70 to 70/30 |
| G.E. Brightness, % | 94 to 97 |
| +325 mesh residue, wt % | Less than 0.5% |
| Particle size | |
| % Finer than 2 micrometers | 90 to 95% |
| Average size, micrometer | 0.6 to 0.8 |
| Scattering coefficient, $m^2/g$ | |
| @ 457 nm | 0.550 to 0.650 |
| @ 577 nm | 0.450 to 0.520 |
| Brookfield viscosity, cp. | |
| 52% solids slurry | |
| @ 20 rpm = 400 to 1000 | |
| @ 100 rpm = 200 to 400 | |
| Hercules viscosity end point. | |
| "A" bob at 50% solids | |
| /dyne-cm $\times 10^5$) rpm = 12 to 16 | |

Aqueous slurries of pigments of the invention possess adequate shear stability to survive production and handling conditions such as described above, using conventional commercial processing equipment and also are sufficiently stable for use in high speed coaters used by paper industry.

In preparing coating colors, conventional adhesives or mixtures of adhesives are used with the deflocculated slurry of cobulked titania and calcined clay. For example, useful coating color compositions are obtained by thoroughly mixing with pigment slurry with from about 5 to about 20 parts by weight adhesive per 100 parts by weight of pigment. Such a coating color, when used for coating light-weight publication paper, produces a product which has excellent opacity, gloss and printability.

The term "adhesive" as used herein refers to those materials known for use in connection with paper pigment, which aid in binding the pigment particles together and, in turn, binding the coating to the paper surface. Such materials include, for example, casein, soybean proteins, starches (dextrins, oxidized starches, enzyme-converted starches, hydroxylated starches) animal glue, polyvinyl alcohol, rubber lattices, styrenebutadiene copolymer latex and synthetic polymeric resin emulsions such as derived from acrylic and vinyl acetates.

The coating color compositions prepared in accordance with the present invention can be applied to papers sheets in a conventional manner. This is a significant attribute of pigments of this invention.

All particle sizes used in the specification and claims are determined with the SEDIGRAPH ® 5000 particle size analyzer and are reported as equivalent spherical diameters (e.s.d.) on a weight percentage basis.

In the example, test results were obtained essentially according to the following TAPPI (Technical Association of the Pulp and Paper Industry) procedures:

75° gloss—TAPPI Standard T480 om-85.
B&L opacity—TAPPI Standard T425 om-86
G.E. brightness—TAPPI Standard T452 om-87

Light scattering and gloss of pigments were determined in some instances. This was done by coating pigment suspensions onto black glass plates at a coat weight of 7.0–14.0 g/m$^2$ (expressed as dry pigment). The reflectance of the coatings after drying in air is measured at wavelengths 457 nm and 577 nm by means of an Elrepho reflectometer. The reflectance values are converted by the use of Kubelka-Munk equations to light scattering values (m$^2$/g). The light scattering values are a measure of the opacity potential of the pigment because the higher values indicate that light, rather than passing through the pigment coating, is reflected and scattered back. The higher the light scattering value, the higher the opacity potential of the pigment. Reflectance is measured at two different wavelengths. The 457 nm wavelength corresponds to the wavelength used in the TAPPI brightness measurement and the 577 nm wavelength is used to measure opacity.

In preparing slurries for measurement of high shear (Hercules) and low shear (Brookfield) viscosity, the PL-3 procedure described in U.S. Pat. No. 4,772,332 was used. Brookfield viscosity was measured using TAPPI procedure T648 om-81 at 20 r.pm. using the 2 or 3 spindle; in some cases Brookfield viscosity was measure at 100 r.p.m. using the 3 spindle. All slurries were formulated with the optimum amount of dispersant needed to produce minimum viscosity, following the procedure described in U.S. Pat. No. 4,772,332.

Optimum dispersions determined by the aforementioned procedure involves making small additions of dispersant to a slurry, mixing and then determining the Brookfield viscosity at 20 r.pm using a #3 spindle. The dispersant level before the viscosity increases (becomes poorer) is the optimum dispersant level. The optimum dispersant level for Hercules viscosity may be different than the optimum for Brookfield viscosity and Brookfield optimum is referred to herein unless otherwise specified.

All proportions of pigments and reagents used herein are on a dry weight basis. For example, the amount of cationic polyelectrolyte (Calgon 261 2V) is reported as active polymer. The amount of dispersant which, as in the case of N ® brand sodium silicate and C211 sodium polyacrylate are supplied as solutions, is also reported as active dispersant.

In all examples, the calcined kaolin pigment was the material supplied under the registered trademark ANSILEX 93. Chemical analyses of various titania pigments used in illustrative examples appear in Example 11. The titania slurry utilized in examples and identified as "RPS" is a 71% (approximate) solids slurry of rutile containing AMP and polyacrylate as dispersants; pH of the slurry as received from the supplier is 8. The sodium silicate was N ® Brand. $SiO_2/Na_2O = 3.2$). The sodium polyacrylate dispersant added to pigment or pigment mixtures was Colloid 211.

EXAMPLE 1

In this example, pigments of the invention were prepared by blending dispersed slurries of $TiO_2$ pigments from various sources with either dispersed slurry or undispersed dry ANSILEX 93 pigment.

EXAMPLE 1(a)

To 457 g. of RPS titania (326.6 g dry), 450 g. water was added under agitation, followed by adding 1.13 g. Colloid 211 sodium polyacrylate dispersant. After mixing for fifteen (15) minutes, 490 g. dry ANSILEX 93 pigment was added portion wise under agitation using a Dispersator mixer. After all the dry ANSILEX 93 pigment was added, the slurry was mixed for ten (10) minutes and its pH was adjusted to 10.1 by the addition of a solution of sodium hydroxide, followed by adding 3.76 g. Calgon 261 LV polymer in 177 g. water in amount corresponding to 0.2% weight active polymer based on total dry pigment. The polymer solution was added drop-wise using an addition funnel to produce a high viscosity slurry. After mixing the slurry for ten minutes, 2.84 g. Colloid C211 and 4.44 g. sodium silicate (N ® Brand) dispersants were added to produced the product at 50% solids.

EXAMPLE (1b)

In this example, slurries of PGS titania and dispersed ANSILEX 93 pigment slurries were used as follows: to 795 g. ANSILEX 93 slurry (406 g. dry), 378.0 g. PGS $TiO_2$ slurry (270.6 g. dry) was added under agitation. After mixing for ten (10) minutes, the pH of the slurry was adjusted to 10.4 with a solution of sodium hydroxide. The slurry was then treated with 3.12 g. of the cationic polymer in 181 g. water (0.2% active polymer to total dry pigment). The polymer was added drop-wise under agitation. After all polymer solution was added, the slurry was mixed for thirty (30) minutes and 1.57 g. Colloid 211 and 1.842 g. sodium silicate dispersants were added to produce product at 50.3% so ids.

EXAMPLE 1(c)

In this example, PGS slurry and dry, undispersed ANSILEX 93 pigment were used as follows: to 455 g. PGS $TiO_2$ slurry (325 g dry.), 510 g. water followed by 1.4 g Colloid 211 were added under agitation. After mixing for ten (10) minutes, 490 g. dry ANSILEX 93 pigment was added portion-wise followed by adjusting the pH to 10.2 with a solution of sodium hydroxide, and adding 3.76 g. polymer in 176 g. water. After mixing for thirty (30) minutes, 1.89 g. Colloid 211 and 2.2 g. sodium silicate were added to produce product at 50% solids.

EXAMPLE 1(d)

In this example, TIONA $TiO_2$ slurry and dispersed ANSILEX 93 pigment slurry were used as follows: to 859 g. ANSILEX 93 slurry (436 g. dry), 400 g. TIONA $TiO_2$ slurry (290.9 g. dry) was added under agitation. After mixing, the pH of the slurry was raised to 11.5 with sodium hydroxide solution followed by the addition of 3.35 g. polymer in 166 g. water. After mixing for additional thirty (30) minutes, 2.53 g. Colloid 211 and 1.98 g. sodium silicate dispersants were added to produce a product at 51.2% solids.

EXAMPLE 2

The Brookfield viscosities and the black glass scattering of the slurry products described in Examples 1(a) through 1(d) are listed below:

| Example | Solids | Brookfield | | Hercules | |
| --- | --- | --- | --- | --- | --- |
| | | 20 rpm | 100 rpm | $S_{457}$ | $S_{577}$ |
| 1(a) | 50% | 750 | 230 | 0.598 | 0.514 |
| 1(b) | 50.3% | 450 | 120 | 0.542 | 0.442 |
| 1(c) | 50% | 600 | 180 | 0.543 | 0.463 |
| 1(d) | 51.2% | 650 | 190 | 0.520 | 0.422 |

EXAMPLE 3

The difference between procedures 1(a), 1(b), 1(c), 1(d), and this example (Example 3) is that pH adjustment to 10 was the last step, while it was at an earlier stage in Example 1.

In this test, to a plastic beaker containing 1000 grams of ANSILEX 93 slurry, 470 grams of a titania slurry pigment (RPS) was added slowly under agitation (using an air-driven mixer equipped with two 2.5 inch blades with 2 inch separation) to produce 57% solids slurry. After mixing the blend for ten minutes, 3.90 grams of Calgon 261 LV as a 0.75% solution in water (based on 0.2% active to total dry pigment) was added slowly under agitation, using a plastic addition funnel to produce a 48.5% solids slurry. After all of the polymer was added, the slurry was mixed for ten minutes, and to a portion of it 1.85 grams sodium polyacrylate (based on 0.2% active to total dry pigment) and 1.08 grams "N" Brand sodium silicate (based on 0.1% active to total dry pigment) were added. After mixing for ten minutes, the pH of the slurry was adjusted to 10.0 with sodium hydroxide, mixed for 30 minutes and spray dried using a Buchi 190 mini spray dryer to produce a dry composite pigment. The Brookfield viscosities and the scattering of the slurries were as follows:

| Slurry | Solids | 20 rpm | 100 rpm | $S_{457}$ | $S_{577}$ |
| --- | --- | --- | --- | --- | --- |
| with polyacrylate only | 48.5% | 1000 | 250 | — | — |
| with polyacrylate and sodium silicate | 48.5% | 250 | 100 | — | — |
| Spray dried, made down | 50.0% | 550 | 150 | 0.563 | 0.490 |

The spray dried product was made down at 50% solids in water using a commercial Waring Blendor mixer. The dry products were added to the water at a setting of 20 volts, followed by mixing at a shear rate of 50 volts for 30 seconds.

EXAMPLE 4

The pigments of previous examples were evaluated in a standard laboratory LWC (light weight coating) study carried out on a Keegan coater.

Controls were RPS and a mechanical blend of TiO2 (RPS slurry) and ANSILEX 93 pigment using the 40/60 weight ratio of TiO2/calcined kaolin present in the pigments of the invention. The blend was made by mixing titania (RPS) and slurries of ANSILEX 93 pigment.

In all coating colors, pigments were used in the amount of 5 and 10 parts by weight to 95 to 90 parts weight of hydrous kaolin (a 50/50 weight mixture of HT ™ kaolin and NUCLAY ® kaolin. (HT is a commercial #2 coating clay; NUCLAY is a mechanically delaminated kaolin product widely used in paper coating.) The blend of the pigments of the invention and hydrous kaolin was used because in 28 to 34 lb. LWC coats weight paper, TiO2 is used at 2 to 10 parts for opacity improvement; however, at a higher coat paper weight (over 34) no TiO2 is needed for opacity improvement.

| Ingredient | Parts By Weight |
| --- | --- |
| Pigment (experimental or control) | 100 |
| PG 280, hydroxy ethylated starch from Penford Products. | 8 |
| CP 640 NA, styrene butadiene latex from Dow Chemical Corporation | 8 |
| Nopcote, calcium stearate emulsion from Henkel Chemicals. | 0.5 |
| Sunrez 700c, an insolubilizer from Sequa Chemicals. | 0.5 |

All coating colors were made at 57% solids and coated at 57, 52, and 47% solids to give a range of coat weights. The coated sheets were calendered at 140° F. to a gloss of 45 to 50 at 5.5 lb. coat weight. the following table shows calendered sheet opacities, interpolated at 5.5 lb./3300 ft2.

| | Coated Sheet Properties | | | | | |
| --- | --- | --- | --- | --- | --- | --- |
| | CONTROL | RPS/A93 | EXAMPLES | | | |
| | RPS | BLEND | 1(a) | 1(b) | 1(c) | 1(d) |
| Gloss % | 48 | 48 | 47 | 46 | 47 | 47 |
| Brightness % | 70.1 | 69.9 | 70.0 | 69.8 | 70.0 | 69.8 |
| Opacity % | 87.5 | 86.7 | 86.9 | 86.6 | 87.1 | 86.9 |

These results are significant considering that the experimental pigments contain only 40% TiO2 as compared to 100% TiO2 in the RPS control.

EXAMPLE 5

This example describes a second preferred method for making pigments of this invention at a solids level of 55% or higher. This example is composed of four similar tests in which variable amount of cationic polymer and additional dispersants were used. High solids pigment is critical in term of shipping cost and settling properties. In this method, the pigment was prepared at 55% solids without the need for spray drying. This solids was achieved by using a dry ANSILEX 93 pigment in the process with a high solids slurry of titania pigment. Using dry ANSILEX 93 pigment will eliminate the need for capital expenditure and reduce the overall process cost. It also provides better monitoring of the process to ensure the desired composition of the product.

It had been found that at a cationic polymer level of 0.2% by weight the process became more difficult to manage in terms of rheology. To obviate this problem, the RPS slurry was diluted with water under agitation using a Premier Dispersator with specifications of 0-60 cycles, 115 volts, and 12 amp., and equipped with an 2.5 inch blade designated as DTA 19909, followed by the addition of sodium polyacrylate and sodium silicate dispersants and undispersed ANSILEX 93 pigment (dry). The pH of the slurry was then adjusted to 10 with sodium hydroxide solution and the 261 LV cationic polymer was added, followed by additional sodium silicate dispersant if required.

EXAMPLE 5(a)

To a 839 grams of titania RPS in a plastic container, 690 grams of water was added under agitation to form a 39.5% slurry. To this slurry, 5.24 grams of sodium polyacrylate (based on 0.15% active to total dry pigment) and 4.08 grams sodium silicate dispersant (based on 0.1% active to total dry pigment), followed by the slow addition of 900 grams dry ANSILEX 93 under increasingly higher agitation rate, to produce a 62% solids slurry which was mixed for an additional 15 minutes after all dry pigment was added. The pH of the slurry was then raised to 10.0 with sodium hydroxide, and 3.46 grams Calgon 261 LV (based on 0.10% active to total dry pigment), as a 1% solution in water, was added to produce a composite pigment at 55% solids. The pigment was then mixed for an additional 30 minutes minimum to produce the final product.

EXAMPLE 5(b)

To 839 grams of titania RPS in a plastic container, 690 grams of water was added under agitation to form 39.5% slurry. To this slurry, 5.24 grams of sodium polyacrylate (based on 0.15% active to total dry pigment) and 4.08 grams sodium silicate dispersant (based on 0.1% active to total dry pigment), followed by the slow addition of 900 grams dry ANSILEX 93 pigment under increasingly higher agitation rate, to produce 62% solids slurry which was mixed for additional 15 minutes after all dry pigment was added. The pH of the slurry was then increased to 10.0 with sodium hydroxide, and 5.19 grams 261 LV (based on 0.15% active to total dry pigment), as a 0.75% solution in water, was added to produce a composite pigment at 55% solids. Thereafter 2.04 grams sodium silicate dispersant (based on 0.05% active to total dry pigment) was added, and the pigment was then mixed for additional 30 minutes minimum to produce the final product.

EXAMPLE 5(c)

To 839 grams of titania RPS in a plastic container, 690 grams of water was added under agitation to form a 39.5% slurry. To this slurry, 5.24 grams of sodium polyacrylate (based on 0.15% active to total dry pigment) and 4.08 grams sodium silicate dispersant (based on 0.1% active to total dry pigment), followed by the slow addition of 900 grams dry ANSILEX 93 under increasingly higher agitation rate, to produce 62% solids slurry which was mixed for additional 15 minutes after all dry was added. The pH of the slurry was then increased to 10.0 with sodium hydroxide, and 6.06 grams 261 LV (based on 0.175% active to total dry pigment), as a 1% solution in water, was added to produce a composite pigment at 55% solids. 3.06 grams sodium silicate dispersant (based on 0.075% active to total dry pigment) was then added, and the pigment was then mixed for an additional 30 minutes minimum to produce the final product.

EXAMPLE 6

The Brookfield viscosities and the black glass scattering of pigments of the invention described in Examples 5(a), 5(b), and 5(c) are shown here. All solids are 55% or about.

| Sample | Brookfield | | Scattering* | |
|---|---|---|---|---|
| | 20 rpm | 100 rpm | $S_{457}$ | $S_{577}$ |
| Example 5(a) | 1050 | 300 | 0.549 | 0.454 |
| Example 5(b)** | 2250 | 550 | — | — |
| Example 5(b) | 1185 | 320 | 0.578 | 0.485 |
| Example 5(c)** | 3010 | 671 | — | — |
| Example 5(c) | 1385 | 347 | 0.567 | 0.477 |

*Scattering was measured at 50% solids.
**Brookfield viscosity of pigment before adding the additional dispersant.

These data show that as the level of polymer increases, the scattering and Brookfield viscosity are increased, and that the need for supplemental dispersant to achieve desirable rheology is also increased.

EXAMPLE 7

This example describes the preparation of a composite bulking pigment similar to that described in example 5(c), except that only sodium polyacrylate dispersant was added prior to the addition of the polymer. In this example, to 420 grams of RPS titania slurry in a plastic container, 363 grams of water was added under agitation to form a 38.5% slurry. To this slurry, 4.36 grams of sodium polyacrylate (based on 0.25% active to total dry pigment) was added, followed by the slow addition of 450 grams dry ANSILEX 93 pigment under increasingly higher agitation rate, to produce a 61% solids slurry which was mixed for an additional 15 minutes after all dry pigment was added. The pH of the slurry was then raised to 10.0 with sodium hydroxide, and 3.03 grams Calgon 261 LV (based on 0.175% active to total dry pigment), as a 1% solution in water, to produce a coflocculated pigment at 55% solids. Incremental addition of sodium silicate dispersant in the amounts of 0.05% (0.98 grams) and 0.025% (0.49 grams), followed by mixing 30 minutes produced a pigment at 55% solids. The properties of the pigment were as follows:

| Coflocculated product: | 20 rpm = 3110 | |
| | 100 rpm = 670 | |
| After adding 0.05% sodium | 20 rpm = 1350 | $S_{457}$ = 0.569 |
| silicate dispersant: | 100 rpm = 350 | $S_{577}$ = 0.480 |
| After adding 0.025% sodium | 20 rpm = 900 | $S_{457}$ = 0.567 |
| silicate dispersant (0.075% total): | 100 rpm = 250 | $S_{577}$ = 0.486 |

This example showed that the process can be simplified by adding one dispersant at a time, while maintaining a low Brookfield viscosity and high black glass scattering.

EXAMPLE 8

This example is similar to example 5(c), except that, to simplify the process, all the dispersant used in the process (in Example 5(c)) was added prior to addition of cationic polymer. In this example, to 839 grams of titania RPS slurry in a plastic container, 725 grams of water was added under agitation to form a 38.5% slurry. To this slurry, 5.24 grams of sodium polyacrylate (based on 0.15% active to total dry pigment) and 6.13 grams sodium silicate dispersant (based on 0.15% active to total dry pigment), followed by the slow addition of 900 grams dry ANSILEX 93 pigment under increasingly higher agitation rate, to produce 61% solids slurry which was mixed for additional 15 minutes after all dry pigment was added. The pH of the slurry was then raised to 10.0 with sodium hydroxide, and 6.06 grams Calgon 261 LV polymer (based on 0.175% active to total dry pigment), as a 1% solution in water, was added. The polymer treated slurry became very thick after adding a portion of the polymer solution and the preparation was aborted.

This example shows the importance of the added dispersant on the process. Under-dispersion or over-dispersion causes the blend of pigments to thicken and become unmixable.

EXAMPLE 9

In this example, 55% solids coflocculated pigment slurries were produced by using titania RPS slurry, ANSILEX 93 slurry, and a higher concentration of the cationic polymer. The two tests described below varied in the sequence of adding cationic polymer and the amount of dispersant added in the process. The preparations were performed in a plastic container under agitation using a Premier Dispersator with specifications of 0–60 cycles, 115 volts, and 12 amp., and equipped with 2.5 inch blade designated as DTA 19909.

EXAMPLE 9(a)

To 279 grams titania RPS slurry, 590 grams of dispersed ANSILEX 93 slurry was added to produce a blend at 57% solids. After mixing for 10 minutes, the pH of the blend was adjusted to 10.0 with sodium hydroxide solution, and 2.30 grams Calgon 261 LV cationic polymer (based on 0.2% active to total dry pigment) as a 2.5% solution in water. After mixing for additional 20 minutes, 1.75 grams sodium polyacrylate dispersant (based on 0.15% active to total dry pigment) and 1.36 grams sodium silicate dispersant (based on 0.15% active to total dry pigment) were added to produce a pigment slurry at 52% solids. The slurry of coflocculated pigments was mixed an additional 30 minutes to form the product.

EXAMPLE 9(b)

In this example, to 279 grams titania RPS slurry, 590 grams of dispersed ANSILEX 93 slurry was added to produce a blend at 57% solids. After mixing for 10 minutes, 1.75 grams sodium polyacrylate dispersant (based on 0.15% active to total dry pigment) and 1.36 grams sodium silicate dispersant (based on 0.15% active to total dry pigment) were added. The pH of the blend was then adjusted to 10.0 with sodium hydroxide solution, and 2.30 grams cationic polymer (on 0.2% active to total dry pigment) as a 2.5% solution in water. After mixing for an 20 minutes, additional 2.04 grams sodium silicate dispersant (based on 0.15% active to total dry pigment) was added for rheology consideration. The slurry of cofloccule pigments was mixed an additional 30 minutes to form the product at 56% solids.

EXAMPLE 10

Brookfield viscosity and the black glass scattering of pigments described in Example 9(a) and 9(b) were measured. Brookfield viscosity was measured at 55% solids and scattering at 50% solids.

| Sample | 20 rpm | 100 rpm | $S_{457}$ | $S_{577}$ |
|---|---|---|---|---|
| Example 9(a) | 2404 | 514 | 0.593 | 0.500 |
| Example 9(b) | 2030 | 486 | 0.573 | 0.499 |

These data show that pigments having higher Brookfield viscosity were produced when the components were coflocculated with 0.2% cationic polymer and contained 55% solids.

EXAMPLE 11

This example illustrates the use of various commercial titania pigments in practice of the invention. The following table provides chemical analyses of some of these pigments namely, TIONA, RCP, provided by SCM Corporation, PGS pigmentary titania provided as a slurry by Kerr-McGee and RPS (Dupont), also a slurry. The analyses indicate that PGS and TIONA were pretreated with alumina and silica whereas RPS was not chemically treated.

| Titania | Type | % $TiO_2$ | % $Al_2O_3$ | % $SiO_2$ | LOI |
|---|---|---|---|---|---|
| RPS | Rutile | 98.1 | <0.50 | 0.20 | 1.22 |
| PGS | Rutile | 91.0 | 3.26 | 3.10 | 2.44 |
| TIONA | Rutile | 98.2 | 1.30 | 0.13 | 0.31 |

EXAMPLE 11(a)

Example 11(a) illustrates practice of the invention using an anionically dispersed ANSILEX 93 slurry and an anionically dispersed slurry of alumina-pretreated titania pigment (PGS). The preparation of the pigments was similar to the preparation of the pigment described in Example 7(b), except that pigment at 50% solids was produced.

To 793 grams of ANSILEX 93 slurry (406 grams dry), 378 grams of PGS slurry (271 grams dry) was added under agitation using an air-driven mixer. The pH of the blend was then adjusted to 10.4 with 20% sodium hydroxide solution followed by coflocculated by adding 0.2% 261 LV polymer (based on active polymer to total dry pigment) as a 0.75% solution in water. The polymer solution was added very slowly using an addition funnel. After mixing the polymer-treated slurry for 20 minutes, 1.57 grams sodium polyacrylate followed by 1.84 grams sodium silicate dispersants were added (0.1% active for each dispersant, based on total dry pigment). The slurry was then mixed for additional 45 minutes to form the final product at 50.3% solids. Brookfield viscosity and black glass scattering of the product were as follows:

| 20 rpm = 450 | $S_{457}$ = 0.542 |
|---|---|
| 100 rpm = 120 | $S_{577}$ = 0.442 |

EXAMPLE 11(b)

This example illustrates the use of dispersed ANSILEX 93 slurry and an anionically dispersed slurry of alumina pre-treated titania (TIONA). To 859 grams of ANSILEX 93 slurry (436 grams dry), 400 grams of TIONA slurry (291 grams dry) was added under agitation using an air-driven mixer. The pH of the blend was then adjusted to 10.4 with 20% sodium hydroxide solution followed by addition of 3.36 grams 261 LV polymer (based on 0.2% active polymer to total dry pigment) as 0.75% solution in water. The polymer solution was added very slowly using an addition funnel. After mixing the flocculated thick slurry for 30 minutes, 2.53 grams sodium polyacrylate and then 1.98 grams sodium silicate dispersants were added (based On 0.15% and 0.10% active respectively, based on total dry pigment). The slurry was then mixed for additional 45 minutes to form the final product at 51.2% solids. The Brookfield viscosity and the black glass scattering of the product were as follows:

| 20 rpm = 650 | $S_{457}$ = 0.524 |
| 100 rpm = 190 | $S_{577}$ = 0.433 |

Examples 11(a) and 11(b) indicate that when used to make a composite titania/calcined kaolin pigment, pretreated $TiO_2$ pigments produced lower black glass scattering than pigments prepared using untreated $TiO_2$ such as RPS.

EXAMPLE 12

This example illustrates the preparation of an anionically predispersed slurry of titania pigment slurry from dry titania pigment and the use thereof in practice of the invention.

A 71.5% $TiO_2$ slurry was made by adding 106 grams RPD (dry $TiO_2$) to 42 grams of water containing 0.65 grams AMP and 1.42 grams sodium silicate (both are based on 0.25% active to dry $TiO_2$). RPD was added under agitation using an air-driven mixer. This dispersed $TiO_2$ slurry was used in making a coflocculated pigment of the invention as follows: to 312 grams dispersed ANSILEX 93 slurry (158 grams dry), the dispersed $TiO_2$ slurry was added (148 grams). After mixing for 10 minutes, the pH of the slurry was adjusted to 11 with sodium hydroxide solution, followed by addition of 1.215 grams Calgon 261 LV polymer as a 1% solution in water (based on 0.2% active polymer to total dry pigment). After mixing for 30 minutes, 0.92 grams sodium polyacrylate, followed by 0.72 grams sodium silicate dispersant, were added (based on 0.15 and 0.10% active, respectively, to total dry pigment). After mixing the slurry for 30 minutes, the properties of the product was as follows:

| 20 rpm = 1600 | $S_{457}$ = 0.458 |
| 100 rpm = 400 | $S_{577}$ = 0.354 |

To reduce viscosity, 0.7 grams of additional sodium silicate dispersant was added to produce a composite pigment with the following properties:

| 20 rpm = 100 | $S_{457}$ = 0.439 |
| 100 rpm = 70 | $S_{577}$ = 0.352 |

EXAMPLE 13

This example illustrates the preparation of anionically dispersed slurry of titania pigment containing sodium polyacrylate as the sole dispersant and the use of this slurry in making pigments of the invention containing only sodium polyacrylate as the dispersant. In this example, two pigments were made from a 50% solids slurry of ANSILEX 93 pigment which was made down without dispersant and a titania pigment slurry containing sodium polyacrylate dispersant only. The two samples were made in the same manner, except that one was prepared by coflocculation with 0.15% polymer and the other with 0.2% polymer. Both samples were made by adding 140 g. $TiO_2$ slurry (100 g. dry) to 300 g. ANSILEX 93 (150 g. dry) in 1000 ml plastic beaker under agitation. After mixing the slurry for ten (10) minutes, the polymer was added, as 1% solution in water, under a high agitation rate. Adding the polymer caused the slurries to become thick. Addition of Colloid 211 sodium polyacrylate (in unmeasured quantity) to each slurry produced thin slurries. The properties of the two products are listed in the following table:

| Sample | % Polymer | Brookfield | | Scattering | |
| | | 20 rpm | 100 rpm | $S_{457}$ | $S_{577}$ |
|---|---|---|---|---|---|
| 1 | 0.15 | 325 | 110 | 0.525 | 0.424 |
| 2 | 0.20 | 650 | 180 | 0.539 | 0.446 |

The scattering and the Brookfield results are similar to results obtained with using RPS $TiO_2$ slurry.

EXAMPLE 14

In this example, zeta potential (ZP) measurements were made at various stages of the process used to produce a pigment of the invention. The pigment was made by adding 648 g. water to 520 g. RPS $TiO_2$ slurry (374 g. dry) under agitation. After mixing for five (5) minutes 561 g. dry ANSILEX 93 pigment was added portionwise to produce a slurry having a pH 6.9. A sample of the slurry was saved for the ZP measurement. The pH of the remaining slurry was then raised to 10.1 with a solution of sodium hydroxide and a sample was saved for the ZP measurements. The remaining slurry was treated with 0.15% 261 LV polymer (1.898 g. in 84 g. water based in active to total dry pigment). After mixing for one (1) hour, a sample was saved for the ZP measurement and 0.2% Colloid 211 and 0.05% sodium silicate dispersants were added to the remaining slurry to form a dispersed product slurry for the ZP measurement.

Zeta potentional measurements were carried out as follows. The four (4) collected slurries were centrifuged at 15000 rpm for ten (10) minutes, followed by filtration over 0.45 and 0.2 micron Nylon membrane filter (NYLAFLO). The clear supernatant fluids were used for the zeta potential measurement on a Lazer Z meter Model 501 (Pen Kem Incorp.) at 100 max meter setting. The results were as follows:

| Sample | Zeta Potential |
|---|---|
| Slurry blend at a pH of 6.9 | −55.0 m. volt |
| Slurry blend at a pH of 10.1 | −56.4 m. volt |
| Flocculated slurry | −35.0 m. volt |
| Flocculated and dispersed slurry | −39.0 m. volt |

These results indicate that slurries were negatively (anionically) charged at all stages of the process. The results also showed that treatment with the cationic polymer caused a significant increase in ZP (made it less negative).

EXAMPLE 15

The product and intermediates of slurries used in preparation of a representative pigment of the invention were collected for analysis by scanning electron microscopy, bulk density, and oil absorption. The pigment was made by diluting 555.5 g. RPS (400 g. dry) with 512 g. water, followed by the slow addition, under agitation of 600 g. dry ANSILEX 93 pigment. After mixing for twenty (20) minutes, sodium hydroxide was added to raise the pH of the slurry from 6.8 to 10.1. The polymer at a treatment level of 0.15% was added as 1% solution in water. After mixing for one (1) hour, 0.1% Colloid 211 polyacrylate and 0.025% sodium silicate dispersants were added to produce a fluid slurry. A part of this slurry was spray dried and pulverized for analysis and the other part was filtered, dried in the oven and pulverized for analysis. Results are reported below.

| Sample | Oil Absorption, cc/g | Bulk Density, g/cc |
|---|---|---|
| Spray Dried | *50.4 | .50 |
|  | **73.7 |  |
| Filtered | *49.5 | .34 |
|  | **67.2 |  |

*ASTM - Rub-out.
**Gardner - Coleman.

A photomicrograph of the slurry product appears in the accompanying figure which was obtained using a conventional back scattering technique to enhance the appearance of the titania particles.

EXAMPLE 16

The following tests were carried out to demonstrate the effects of using Calgon 261 polymer on titania pigment alone (RPS slurry), calcined kaolin alone (ANSILEX 93 pigment) and, for purposes of comparison, a physical mixture of these pigments (the mixture of pigments used in the process of the invention). In some tests, the amount of cationic polymer was varied in amount up to 0.7%. No cationic polymer was added to the blend.

EXAMPLE 16(a)

In this example, the black glass scattering and the Brookfield viscosity of a $TiO_2$ slurry were measured as a function of pH. The RPS slurry at 71.5% was diluted to 50% solids with water and the pH was adjusted with sodium hydroxide solution prior to measurements. The results are listed in the following table:

| Sample | Solids | pH | Brookfield | | Scattering | |
| | | | 20 rpm | 100 rpm | $S_{457}$ | $S_{577}$ |
|---|---|---|---|---|---|---|
| 1 | 50% | As is, 8.9 | 50 | 33 | 0.327 | 0.220 |
| 2 | 50% | 9.5 | 45 | 33 | 0.340 | 0.227 |
| 3 | 50% | 10.0 | 60 | 35 | 0.327 | 0.248 |

EXAMPLE 16(b)

Scattering Of $TiO_2$, And Calcined Kaolin Individually And 60/40 Blend Thereof—No Cationic Polymer Addition Dry ANSILEX 93 was made down in water at 50% solids without dispersant. DuPont's RPS dispersed slurry was received at 71.5% solids. The 60/40 ANSILEX 93/$TiO_2$ blend was made by mixing $TiO_2$ at 71.5% solids with ANSILEX 93, at 50% solids, followed by adding the appropriate amount of water.

All scattering measurements were done at 30% solids due to the difficulty of drawdown ANSILEX 93 pigment at higher solids.

| Pigment | $S_{457}$ | $S_{577}$ |
|---|---|---|
| $TiO_2$ | 0.380 | 0.265 |
| ANSILEX 93 | 0.284 | 0.208 |
| ANSILEX 93 $TiO_2$ 60/40 blend | 0.433 | 0.353 |

EXAMPLE 16(c)

Effect Of Adding Cationic Polymer To Pigments Or Pigment Mixtures Of Example 16(b)

A dispersed ANSILEX 93 slurry at 51.6% solids (pH of 6.3) had the following properties:
20 rpm = 310
100 rpm = 120

The dispersant in this slurry was Colloid 211 polyacrylate A portion of this slurry was diluted with water to 30% solids under agitation. The scattering of the diluted slurry was as follows:
$S_{457} = 0.237$
$S_{577} = 0.160$ In a plastic beaker, 738 g. of the ANSILEX 93 slurry at 51.6% solids (381 g. dry) was treated with 0.88 g. Calgon 261 LV polymer (0.1% based on active polymer to dry ANSILEX 93), as a solution in 19 g. of water (2% solution). The polymer solution was added slowly under agitation to produce a flocculated slurry with the following properties:

| Solids = 50.3% | 20 rpm = 200 |
| | 100 rpm = 105 |
| Scattering at 30% solids | $S_{457} = 0.248$ |
| | $S_{577} = 0.167$ |

When 0.2% by weight (active weight basis) of the polymer solution was added to the ANSILEX 93 slurry, a very thick, unmixable slurry resulted. This slurry was cationically dispersed by adding a total of 0.72% Calgon 261 LV (based on active polymer) to produce a slurry with the following properties:

| | Solids = 49.6% |
| | 20 rpm = 425 |
| | 100 rpm = 110 |
| Scattering at 30% solids | $S_{457} = 0.277$ |
| | $S_{577} = 0.197$ |

A similar test was carried out using dry undispersed ANSILEX 93 pigment. The dry ANSILEX 93 was make down at 50% solids in water without dispersant. The make down process consisted of adding the dry ANSILEX 93 pigment to water under agitation. After all ANSILEX 93 was added, the slurry was sheared in a blender at 94 volts for forty-five (45) seconds.

This slurry had the following properties:

| | Solids = 50% |
| | pH = 6.1 |
| | 20 rpm = 75 |
| | 100 rpm = 50 |
| Scattering at 30% solids | $S_{457} = 0.257$ |
| | $S_{577} = 0.175$ |

In a plastic beaker, 845 g. of the 50% solids slurry of the ANSILEX 93 described above, was treated with 0.958 g. Calgon 261 LV polymer as a solution in 19 g. of water (based on 0.1% active polymer). This produced a very thick, unmixable slurry. The thick slurry was cationically dispersed by adding a total of 0.435% of the cationic polymer (based on the active polymer). The resulting slurry had the following properties:

Solids 50%, pH = 6.1

-continued

| | |
|---|---|
| Scattering at 30% solids | 20 rpm = 425 |
| | 100 rpm = 130 |
| | $S_{457}$ = 0.259 |
| | $S_{577}$ = 0.187 |

These tests demonstrate that treatment of titania or calcined kaolin alone with cationic polymer did not result in products having appreciably higher scatter than untreated pigments. Also, the scattering of the 60/40 blend of ANSILEX 93/TiO$_2$ in Example 16(b) is lower than the scattering of the same blend, treated with cationic polymer, as shown in the various illustrative examples For example, treatment with 0.2% polymer produced a composite pigment with a scattering of 0.500 at 577 nm.

What is claimed is:

1. A composite opacifying pigment comprising particles of titania pigment and particles of calcined kaolin coflocculated and bound together in the form of coherent aggregates by an organic cationic polyelectrolyte.

2. The pigment of claim 1 wherein said polyelectrolyte is a quaternary ammonium salt polymer.

3. The pigment of claim 1 wherein said cationic polyelectrolyte is dimethyl dialkyl ammonium chloride.

4. The pigment of claim 1 in which said titania and calcined kaolin are coflocculated at a pH in the range of 9.5 to 11.

5. The pigment of claim 1 wherein the weight ratio of titania to calcined kaolin is in the range of 10:90 to 90:10.

6. The pigment of claim 1 wherein the weight ratio of titania to calcined kaolin is in the range of 35:65 to 65:35.

7. The pigment of claim 1 wherein said pigment is rutile.

8. The pigment of claim 1 wherein said titania pigment is anatase.

9. The pigment of claim 1 wherein the weight ratio of titania to calcined kaolin is in the range of 30:70 to 50:50, and said cationic polyelectrolyte is dimethyl dialkyl ammonium chloride, added in amount in the range of 0.1% to 0.25% based on the combined weight of calcined kaolin and titania pigments.

10. A method for manufacturing a composite opacifying pigment which comprises: providing particles of titania pigment, providing particles of calcined kaolin pigment, mixing said particles together in the presence of water to form a slurry containing a physical admixture of said particles, introducing a water-soluble cationic polyelectrolyte in the presence of water either to said particles of titania pigment, said particles of calcined kaolin pigment or a physical admixture thereof, at a pH above 9 and in the presence of at least one anionic pigment dispersant, a sufficient amount of said cationic polyelectrolyte being added to coflocculate and bind together said particles of titania and said particles of calcined kaolin into unitary coherent particles, and recovering the coflocculated particles of titania pigment and calcined kaolin pigment, and, optionally adding additional anionic pigment dispersant to said coflocculated bulked particles.

11. The method of claim 10 wherein sufficient anionic dispersant is present in the recovered coflocculated bulked particles to result in a 50% solids fluid nonsettling slurry.

12. The method of claim 10 wherein the anionic dispersant is an alkali metal or ammonium salt of a polyacid.

13. The method claim 10 wherein the anionic dispersant comprises a sodium, potassium or ammonium salt of silicic, phosphoric, acrylic or methacrylic acid or combinations thereof.

14. The method of claim 10 wherein the anionic dispersant comprises sodium silicate, sodium polyacrylate or mixtures thereof.

15. The method of claim 10 wherein said anionic dispersant comprises a mixture of sodium silicate and sodium polyacrylate.

16. The method claim 10 wherein the pH at which coflocculation takes place is in the range of 9.5 to 11.

17. The method of claim 10 wherein said cationic polyelectrolyte is added to an anionically dispersed aqueous slurry of said particles of titania in amount in excess of that required to flocculate said particles of titania, and particles of calcined kaolin are thereafter mixed with said slurry of titania containing said cationic polyelectrolyte.

18. The method of claim 10 wherein said cationic polyelectrolyte is added to an anionically dispersed slurry of particles of calcined kaolin clay before an anionically dispersed slurry of said titania is mixed with said particles of titania and before cationic polyelectrolyte is added.

19. The method of claim 10 wherein said particles of calcined kaolin and said particles of titania are mixed together before said cationic polyelectrolyte is added.

20. The method of claim 10 wherein the weight ratio of titania to calcined kaolin in the coflocculated mixture is in the range of 10:90 to 90:10.

21. The method of claim 10 wherein the weight ratio of titania to calcined kaolin is in the range of 35:65 to 65:35.

* * * * *